(12) United States Patent
Su

(10) Patent No.: US 9,375,836 B2
(45) Date of Patent: Jun. 28, 2016

(54) TOOL RACK

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

( * ) Notice: Subject to any disclaimer, the term of this patent is extended or adjusted under 35 U.S.C. 154(b) by 0 days.

(21) Appl. No.: 14/506,734

(22) Filed: Oct. 6, 2014

(65) Prior Publication Data

US 2015/0151428 A1    Jun. 4, 2015

(30) Foreign Application Priority Data

Dec. 4, 2013  (TW) .............................. 102144377 A

(51) Int. Cl.
| | | |
|---|---|---|
| *A47F 7/00* | (2006.01) | |
| *B25H 3/04* | (2006.01) | |
| *B25B 13/56* | (2006.01) | |

(52) U.S. Cl.
CPC ............ *B25H 3/04* (2013.01); *B25B 13/56* (2013.01); *Y10T 403/7039* (2015.01)

(58) Field of Classification Search
CPC ............ B25H 3/003; B25H 3/04; B25H 3/06; A47F 5/0846; A47F 5/0853; A47F 5/0838; A47F 5/00; A47F 7/00; B25B 13/56; Y10T 403/7039
USPC ............... 211/70.6, 94.01, 69, 69.5; 206/349, 206/372, 378
See application file for complete search history.

(56) References Cited

U.S. PATENT DOCUMENTS

| | | | | |
|---|---|---|---|---|
| 5,715,951 | A * | 2/1998 | Dembicks | B25H 3/06 206/378 |
| 5,897,001 | A * | 4/1999 | Dembicks | B25B 13/56 206/378 |
| 6,250,466 | B1 * | 6/2001 | Ernst | B25H 3/003 206/378 |
| 6,386,363 | B1 * | 5/2002 | Huang | B25H 3/003 206/1.5 |
| 6,415,933 | B1 * | 7/2002 | Kao | B25H 3/003 206/378 |
| 6,508,360 | B1 * | 1/2003 | Chen | B25H 3/003 206/349 |
| 6,902,058 | B1 * | 6/2005 | Chang | B65D 73/0064 206/378 |
| 8,381,905 | B1 * | 2/2013 | Kao | B25H 3/003 206/1.5 |
| 8,875,884 | B1 * | 11/2014 | Lee | B25H 3/04 206/1.5 |
| 9,138,890 | B2 * | 9/2015 | Lee | B25H 3/003 |
| 2003/0019775 | A1 * | 1/2003 | Ernst | B25H 3/003 206/378 |

(Continued)

FOREIGN PATENT DOCUMENTS

TW       I395646 I       5/2013

*Primary Examiner* — Jennifer E Novosad
(74) *Attorney, Agent, or Firm* — Alan D. Kamrath; Kamrath IP Lawfirm, P.A.

(57) ABSTRACT

A tool rack includes a main body and at least one joint including a first end disposed on the main body, a second end, a flange between the first and second ends, an elastic structure extending from the flange to the second end, and at least one protrusion extending radially from the elastic structure. The elastic structure includes a plurality of elastic members arranged annularly and delimiting an open space. Two adjacent elastic members of the plurality of elastic members are separated from one another with a gap. The flange has a maximum width defining a first width. The second end of the at least one joint that includes the protrusion has a maximum width defining a second width. The second width is not less than the first width.

17 Claims, 9 Drawing Sheets

(56) References Cited

U.S. PATENT DOCUMENTS

| | | | | |
|---|---|---|---|---|
| 2004/0188366 A1* | 9/2004 | Tong | B25H 3/003 | 211/70.6 |
| 2005/0102793 A1* | 5/2005 | Shih | B25H 3/003 | 16/96 R |
| 2006/0207951 A1* | 9/2006 | Wang | A47F 7/024 | 211/70.6 |
| 2006/0234846 A1* | 10/2006 | Tucker | B25H 3/04 | 483/26 |
| 2007/0102381 A1* | 5/2007 | Nguy | B25H 3/025 | 211/70.6 |
| 2010/0025562 A1* | 2/2010 | Shiao | B25H 3/04 | 248/682 |
| 2012/0138553 A1* | 6/2012 | Kao | B25H 3/06 | 211/70.6 |
| 2012/0267271 A1* | 10/2012 | Huang | B25H 3/04 | 206/349 |
| 2013/0068643 A1* | 3/2013 | Hsieh | B25H 3/04 | 206/349 |
| 2013/0126449 A1* | 5/2013 | Sh | B25H 3/04 | 211/4 |
| 2013/0153521 A1* | 6/2013 | Kao | B25H 3/04 | 211/70.6 |
| 2013/0240394 A1* | 9/2013 | Wang | B25H 3/04 | 206/372 |
| 2014/0209780 A1* | 7/2014 | Chang | A47F 5/0823 | 248/551 |
| 2015/0151428 A1* | 6/2015 | Su | B25B 13/56 | 403/361 |

* cited by examiner

TOOL RACK

BACKGROUND OF THE INVENTION

1. Field of the Invention

The present invention relates to a tool rack.

2. Description of the Related Art

TW Pat. No. 1395646 shows a hand tool hanger. The hand tool hanger includes a backboard. The backboard includes a plurality of rails, which are parallel to one another. The plurality of rails respectively includes a positioning set engaging therewith. The positioning set includes a plurality of positioning blocks. The plurality of positioning blocks is movable relative to the backboard. The plurality of positioning blocks moves on the respective rail when in a relative movement with respect to the backboard. Each of the plurality of positioning blocks is provided to receive a socket.

Furthermore, the plurality of rails is arranged side by side. Consequently, the hand tool hanger has a substantial size and is not easily portable. In addition, it is desirable to design a positioning block that can allow a socket to engage therewith and disengage therefrom without difficulty.

The present invention is, therefore, intended to obviate or at least alleviate the problems encountered in the prior art.

SUMMARY OF THE INVENTION

According to the present invention, a tool rack includes a main body and at least one joint including a first end disposed on the main body, a second end opposite to the first end in a direction of a first phantom axis and distal to the main body, a flange between the first and second ends, an elastic structure extending from the flange to the second end, and at least one protrusion extending radially outward from the elastic structure. The elastic structure includes a plurality of elastic members arranged annularly and delimiting an open space. Two adjacent elastic members of the plurality of elastic members are separate from one another with a gap. The gap connects to the open space. The flange has a maximum width defining a first width measured in a width direction of the at least one joint. The second end of the at least one joint that includes the protrusion has a maximum width defining a second width measured in the width direction of the at least one joint. The width direction of the at least one joint is radial to the direction of the first phantom axis. The second width is not less than the first width.

The rack tool is adapted to hold a socket. When the tool rack holds the socket, the socket is restrained by the protrusion, with the socket including an inner periphery thereof receiving the at least one joint, and with the flange and the protrusion abutting the inner periphery of the socket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure. The abstract is neither intended to define the invention, which is measured by the claims, nor is it intended to be limiting as to the scope of the invention in any way.

It is therefore an objective of the present invention to provide a tool rack that allows a tool to engage therewith and disengage therefrom without difficulty.

It is therefore another objective of the present invention to provide a tool rack that can securely hold a tool.

It is another objective of the present invention to provide a tool rack that allows a user to easily find a tool of the desired size.

Other objectives, advantages, and new features of the present invention will become apparent from the following detailed description of the invention when considered in conjunction with the accompanied drawings.

DETAILED DESCRIPTION OF THE INVENTION

Figure 1:
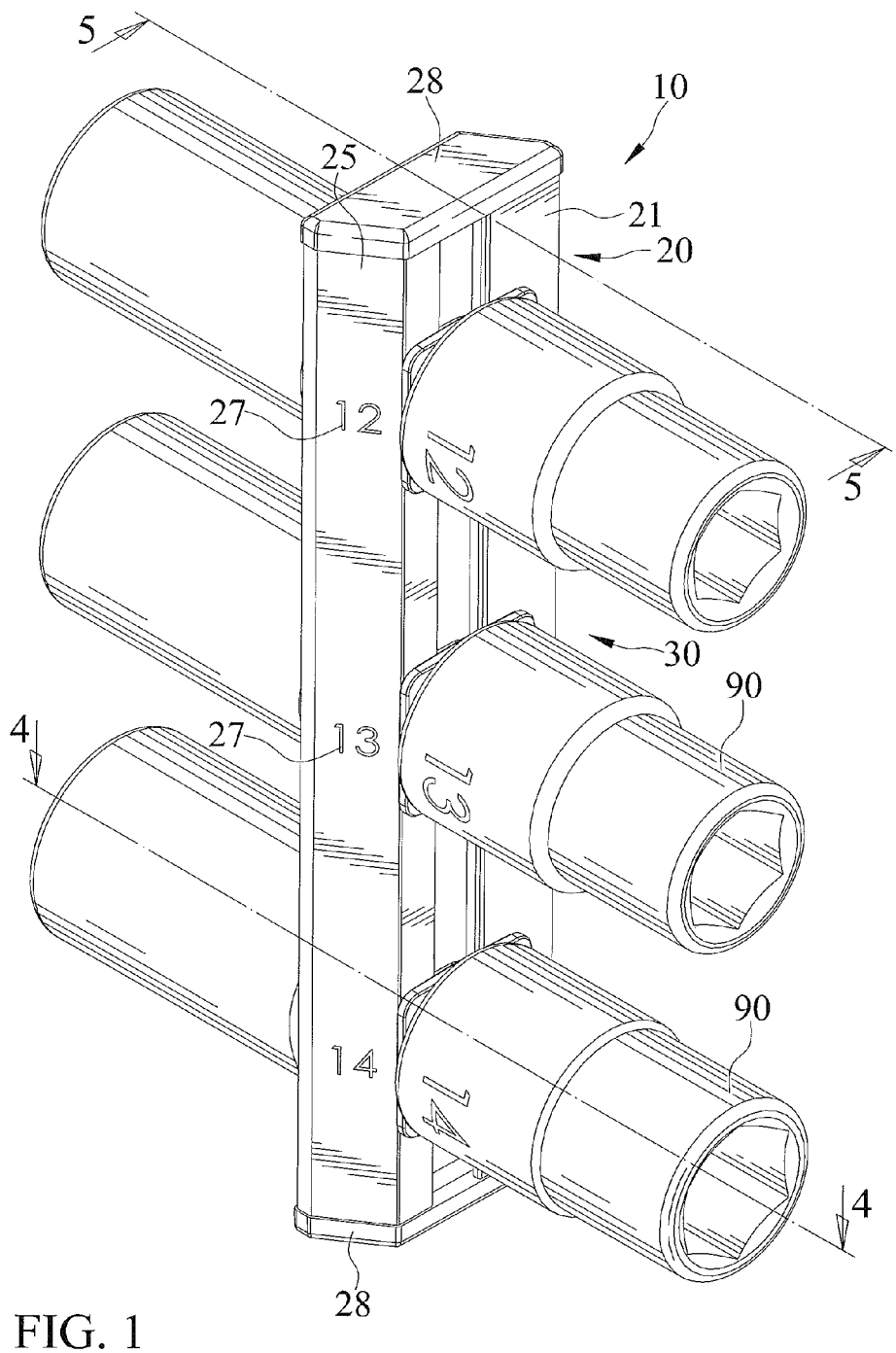
FIG. 1 is a perspective view of a tool rack in accordance with a first embodiment of the present invention.
Figure 2:
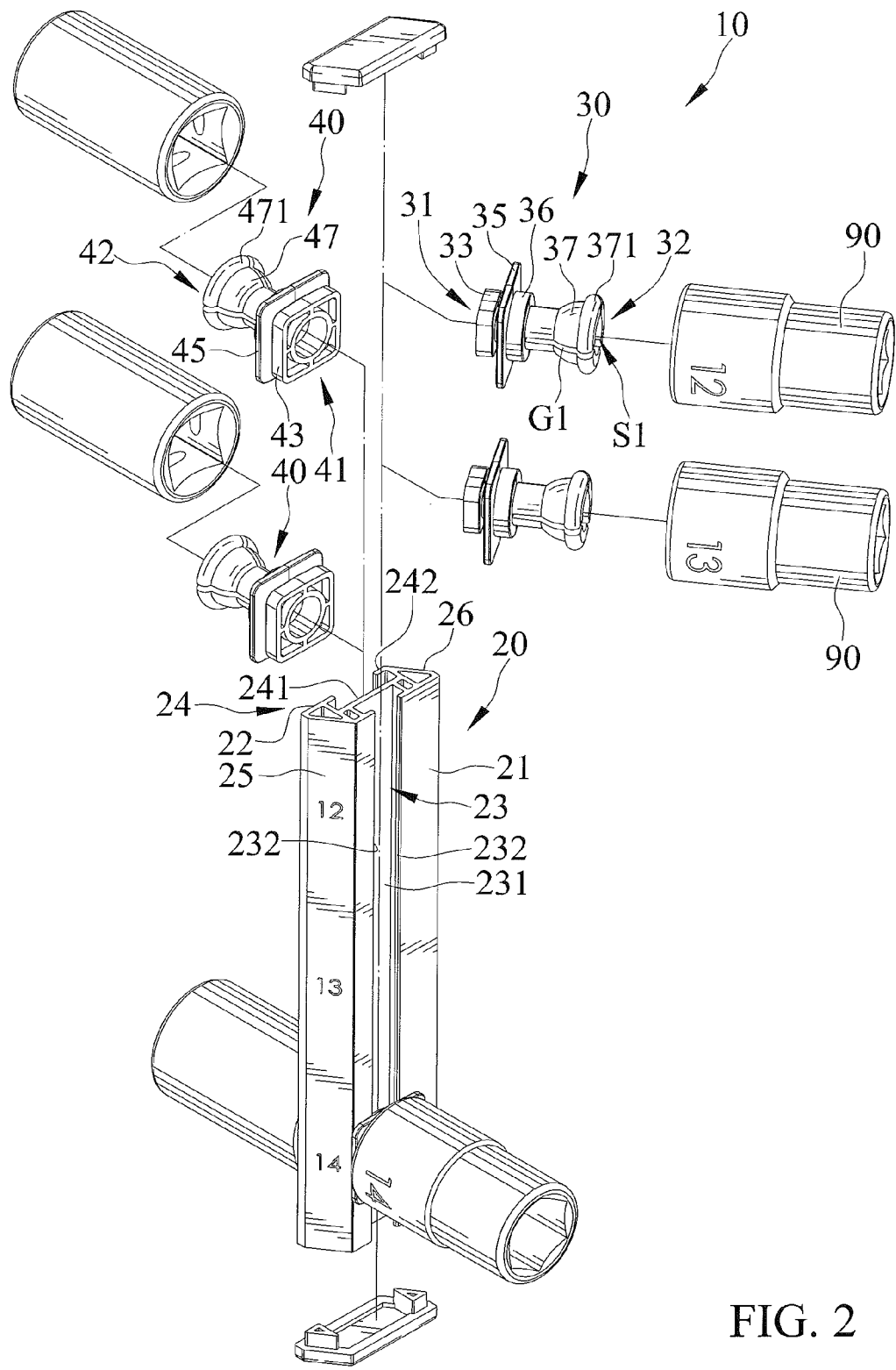
FIG. 2 is an exploded perspective view of the tool rack of the first embodiment of the present invention.
Figure 3:
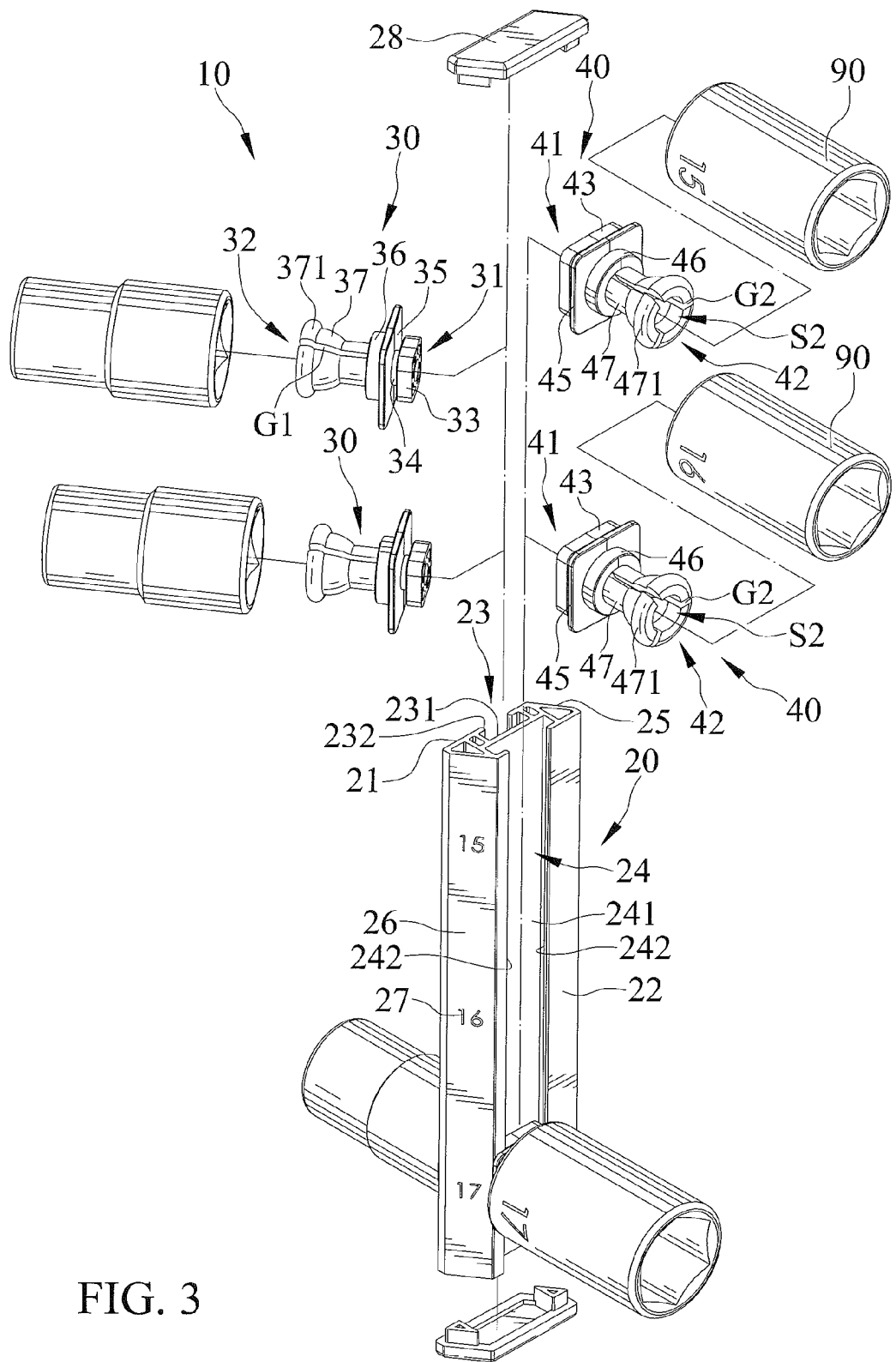
FIG. 3 is another perspective view of the tool rack of the first embodiment of the present invention, taken from an angle different from that of FIG. 2.
Figure 4:
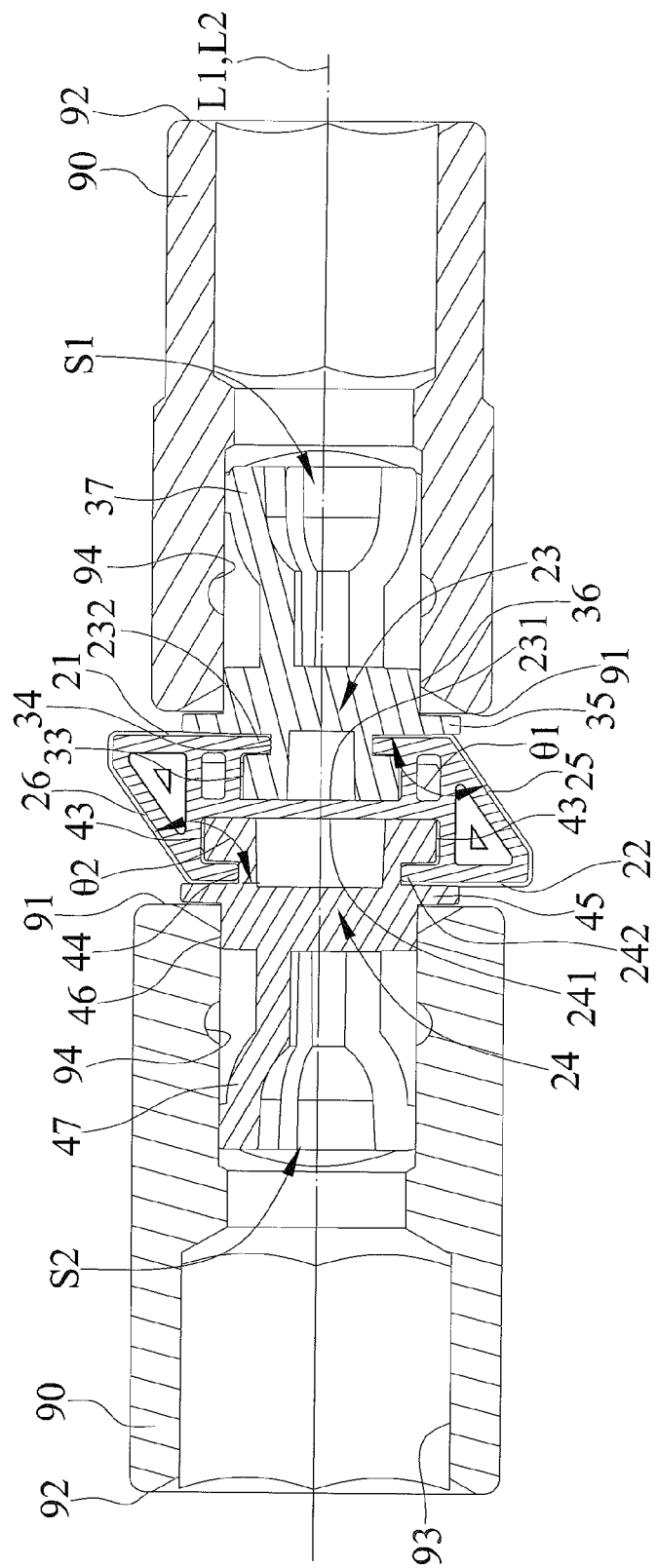
FIG. 4 is a cross-sectional view taken along line 4-4 of FIG. 1.
Figure 5:
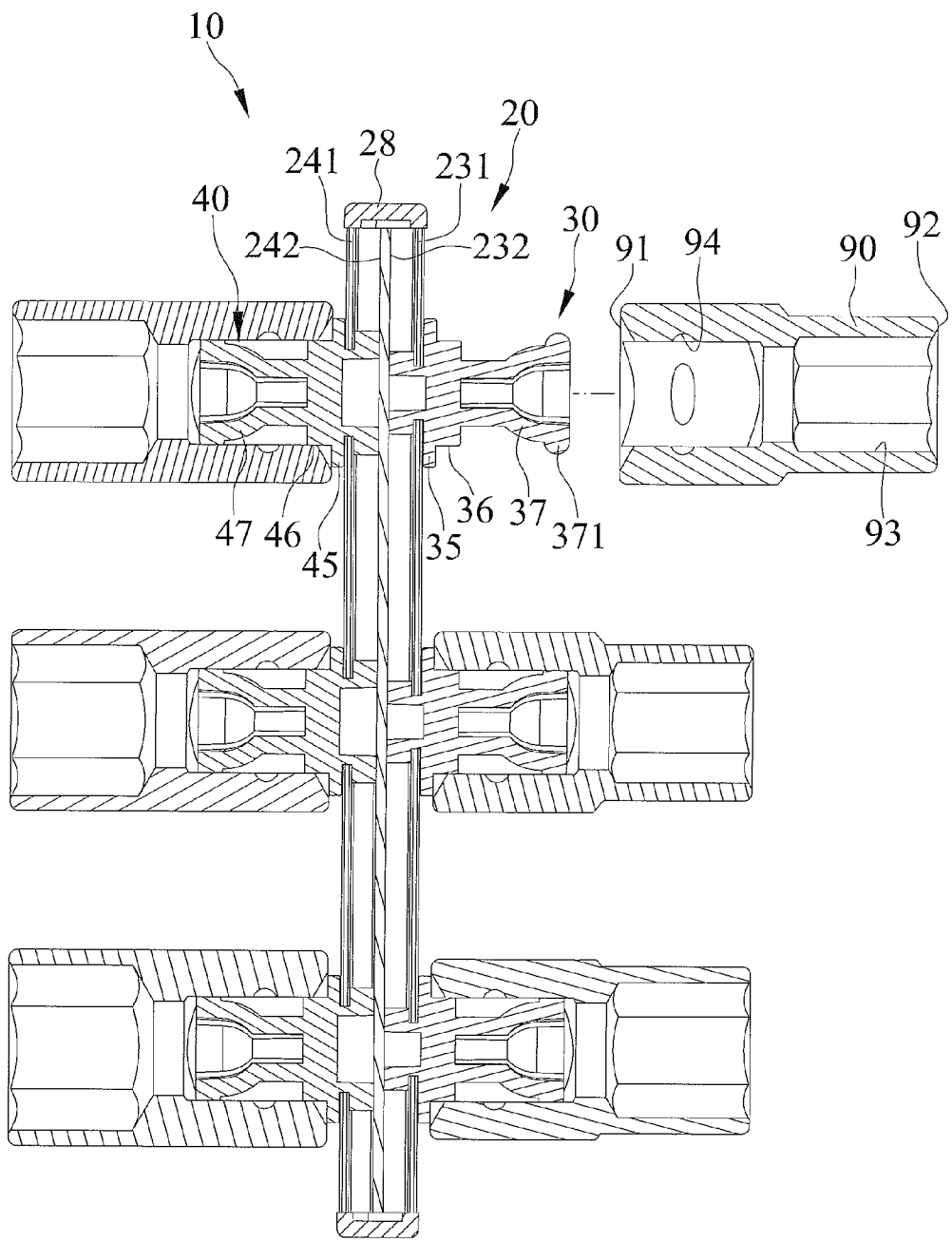
FIG. 5 is a cross-sectional view taken along line 5-5 of FIG. 1.
Figure 6:
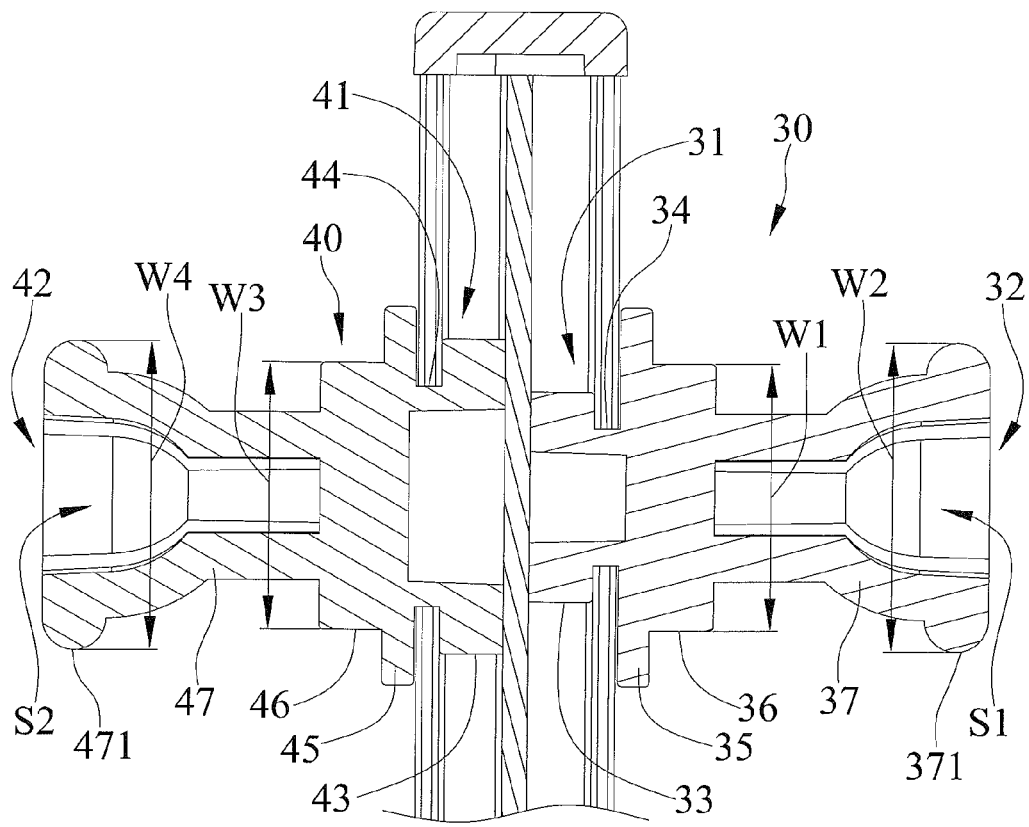
FIG. 6 is a partial, enlarged view of FIG. 5.

FIGS. 1 through 6 show a tool rack 10 in accordance with a first embodiment of the present invention. The tool rack 10 includes a main body 20 and at least one joint such as first and second joints 30 and 40 disposed on the main body 20.

The main body 20 defines a base with a first base side and a second base side opposite the first base side. The first base side of the main body 20 includes a first outer surface 21. The second base side of the main body 20 includes a second outer surface 22 opposite the first outer surface 21. The main body 20 delimits at least one groove such as first and second grooves 23 and 24. The first base side of the main body 20 delimits the first groove 23. The first groove 23 extends on the first outer surface 21 of the main body 20. The first groove 23 includes a space and has a first bottom side 231 and two first restraining lateral sides 232. The second base side of the main body 20 delimits the second groove 24. The second groove 24 extends on the second outer surface 22 of the main body 20. The second groove 24 includes a space and has a second bottom side 241 and two second restraining lateral sides 242. The first and second grooves 23 and 24 are of different sizes. The first bottom side 231 of the first groove 23 has a breadth smaller than a breadth of the second bottom side 241 of the second groove 24, but should not be regarded limiting. However, the first and second grooves 23 and 24 may be of equal size. The open ends of the first and second grooves 23 and 24 are of different sizes. The first base side of the main body 20 includes a third outer surface 25 extending from and inclining at a first included angle θ1 with respect to the first outer surface 21 thereof, and the first included angle θ1 is greater than 90 degrees and less than 180 degrees. The second base side of the main body 20 includes a fourth outer surface 26 extending from and inclining at a second included angle θ2 with respect to the second outer surface 22 thereof, and the second included angle θ2 is greater than 90 degrees and less than 180 degrees. The first and second included angles θ1 and θ2 may be equal. The first, second, third, and fourth outer surfaces 21, 22, 25, and 26 incorporate to form a full outer periphery of the main body 20. The main body 20 includes each of the third and fourth outer surfaces 25 and 26 thereof including at least one size indicia 27.

The at least one joint includes the at least one first joint 30 disposed on the first base side and the at least one second joint 40 disposed on the second base side, respectively. The at least one first joint 30 is disposed on the first outer surface 21. The at least one second joint 40 is disposed on the second outer surface 22. The first base side of the main body 20 can include a plurality of first joints 30 disposed thereon. Likewise, the second base side of the main body 20 can include a plurality of second joints 40 disposed thereon.

The at least one first joint 30 includes a first end 31 disposed on the main body 20, a second end 32 opposite to the first end 31 in a direction of a first phantom axis L1 and distal to the main body 20, a first flange 36 between the first and second ends 31 and 32, a plurality of first elastic members 37 extending from the first flange 36 to the second end 32, and at least one first protrusion 371 extending radially outward from the second end 32. The at least one first joint 30 includes the first end 31 thereof including a first connecting structure engaging in the first groove 23. The at least one first joint 30 includes the first connecting structure configured to include a first pedestal 33 restrained in a larger compartment of the space of the first groove 23 and a first neck 34 restrained in a smaller compartment of the space of the first groove 23, respectively. The first groove 23 has an open end delimiting an end of the smaller compartment of the space of the first groove 23 and includes the first bottom side 231 thereof opposite the open end. The at least one first joint 30 includes the first end 31 thereof including a first platform 35 between the first connecting structure and the first flange 36. The first platform 35 includes a first side thereof including the first connecting structure extending therefrom and a second side thereof including the first flange 36 extending therefrom, respectively. The first platform 35 has a size greater than a size of the open end of the first groove 23 and is disposed outside the first groove 23. The first side of the first platform 35 can rest on a wall of the main body 20. The at least one first joint 30 includes the second end 32 thereof defining a free end, i.e., the second end 32 of the at least one first joint 30 does not abut the main body 20. The plurality of first elastic members 37 is arranged annularly and delimits a first open space S1. The first open space S1 is circumferentially surrounded by the plurality of first elastic members 37. Two adjacent first elastic members 37 of the plurality of first elastic members 37 separate from one another with a first gap G1. The first gap G1 connects to the first open space S1. Each of the plurality of first elastic members 37 has a first longitudinal length and the first gap G1 between two adjacent first elastic members 37 of the plurality of first elastic members 37 has a second longitudinal length respectively measured in the direction of the the first phantom axis L1. The first and second longitudinal lengths are equal. Each of the plurality of first elastic members 37 has a first end adjacent to the first flange 36 and a second end opposite the first end in the direction of the first phantom axis L1. The first and second ends of each of the plurality of first elastic members 37 extend annularly and radially to the direction of first phantom axis L1. The at least one first protrusion 371 includes one first protrusion 371 extending from each of the plurality of first elastic members 37. The at least one first protrusion 371 extends annularly and radially to the direction of the first phantom axis L1.

The first flange 36 in a width direction thereof has a maximum width defining a first width W1. The first protrusion 371 in a width direction thereof has a maximum width defining a second width W2. The width directions of the first flange 36 and the first protrusion 371 are radial to the direction of the first phantom axis L1. The second width W2 is not less than the first width W1. The at least one first joint 30 has a width measuring an end of the first elastic structure that is adjacent to the first flange 36 less than the first width W1.

The at least one second joint 40 includes a first end 41 disposed on the main body 20, a second end 42 opposite to the first end 41 in the direction of a second phantom axis L2 and distal to the main body 20, a second flange 46 between the first and second ends 41 and 42, a plurality of second elastic members 47 extending from the second flange 46 to the second end 42, and at least one second protrusion 471 extending radially outward from the second end 42. The at least one second joint 40 includes the first end 41 thereof including a second connecting structure engaging in the second groove 24. The at least one second joint 40 includes the second connecting structure configured to include a second pedestal 43 restrained in a larger compartment of the space of the second groove 24 and a second neck 44 restrained in a smaller compartment of the space of the second groove 24, respectively. The second groove 24 has an open end delimiting an end of the smaller compartment of the space of the second groove 24 and includes the second bottom side 241 thereof opposite the open end. The at least one second joint 40 includes the first end 41 thereof including a second platform 45 between the second connecting structure and the second flange 46. The second platform 45 includes a first side thereof including the second connecting structure extending therefrom and a second side thereof including the second flange 46 extending therefrom, respectively. The second platform 45 has a size greater than a size of the open end of the second groove 24 and is disposed outside the second groove 24. The first side of the second platform 45 can rest on a wall of the main body 20. The at least one second joint 40 disposed on the main body 20 includes the second end 42 thereof defining a free end, i.e., the second end 32 of the at least one first joint 30 does not abut the main body 20. The plurality of second elastic members 47 is arranged annularly and delimit a second open space S2. The second open space S2 is circumferentially surrounded by the plurality of second elastic members 47. Two adjacent second elastic members 47 of the plurality of second elastic members 47 are separate from one another with a second gap G1. The second gap G2 connects to the second open space S2. Each of the plurality of second elastic members 47 has a third longitudinal length, and the second gap G1 between two adjacent second elastic members 47 of the plurality of second elastic members 47 has a fourth longitudinal length respectively measured in the direction of the second phantom axis L2. The third and fourth longitudinal lengths are equal. Each of the plurality of second elastic members 47 has a first end adjacent to the second flange 46 and a second end opposite the first end in the direction of second phantom axis L2. The first and second ends of each of the plurality of second elastic members 47 extend annularly and radially to the direction of the second phantom axis L2. The at least one second protrusion 471 includes one second protrusion 471 extending from each of the plurality of first elastic members 37. The at least one second protrusion 471 extends annularly and radially to the direction of the second phantom axis L2.

The second flange 46 in a width direction thereof has a maximum width defining a third width W3. The second protrusion 471 in a width direction thereof has a maximum width defining a fourth width W4. The width directions of the second flange 46 and the second protrusion 471 are radial to the direction of the second phantom axis L2. The fourth width W4 is not less than the third width W3. The at least one second joint 40 has a width measuring an end of the second elastic structure that is adjacent to the second flange 46 less than the third width W3.

The at least one first joint 30 and the at least one second joint 40 are adapted to be aligned, with the first phantom axis L1 aligning with the second phantom axis L2.

The at least one size indicia 27 is adjacent and next to the at least one joint. A user can engage the at least one first joint 30 or the at least one second joint 40 with at least one tool that is of a size corresponding to the at least one size indicia 27. The at least one size indicia 27 is displayed on the main body 20, such that the user can easily notice the size indicia 27 and without interference from the at least one tool.

The at least one tool is an at least one socket 90. The at least one socket 90 has a first end 91 and a second end 92 opposite the first end 91. The at least one socket 90 includes the first end 91 thereof including a first cavity extending therefrom in a first direction. The at least one socket 90 includes the inner periphery thereof delimiting the first cavity. The first cavity is connected to a recess 94. The recess 94 extends radially outward from the first cavity in a second direction, which is radial to the first direction. The at least one socket 90 includes the second end 92 thereof including a driving end. The driving end is configured to include a driving structure 93 delimited by the inner periphery of the socket 90. The driving structure 93 forms a second cavity. The at least one first protrusion 371 is free of interference with the first driving structure when the at least one socket 90 includes the inner periphery thereof receiving the at least one first joint 30. Likewise, the at least one second protrusion 471 is free of interference with the second driving structure when the at least one socket 90 includes the inner periphery thereof receiving the at least one second joint 40. When the tool rack 10 includes the at least one first joint 30 holding the at least one socket 90, the at least one socket 90 is restrained by the at least one first protrusion 371, with the at least one socket 90 including an inner periphery thereof receiving the at least one first joint 30, and with the at least one first protrusion 371 abutting the inner periphery of the at least one socket 90. The at least one socket 90 is further restrained by the first flange 36, with the at least one socket 90 including the inner periphery thereof receiving the at least one first joint 30, and with the first flange 36 abutting the inner periphery of the at least one socket 90. When the tool rack 10 includes the at least one second joint 40 holding the at least one socket 90, the at least one socket 90 is restrained by the at least one second protrusion 371, with the at least one socket 90 including an inner periphery thereof receiving the at least one second joint 40, and with the at least one second protrusion 471 abutting the inner periphery of the at least one socket 90. The at least one socket 90 is further restrained by the second flange 46, with the at least one socket 90 including the inner periphery thereof receiving the at least one second joint 40, and with the second flange 46 abutting the inner periphery of the at least one socket 90.

In addition, the main body 20 includes two distal ends thereof engaging with two caps 28, with one of the two caps 28 mounted on and enclosing one of the two distal ends of the main body 20, and with the other of the two caps mounted on and enclosing the other of the two distal ends of the main body 20. Each of the two caps 28 includes a circumferential edge with a shape corresponding to that of the outer periphery of the main body 20. The two caps 28 can also enclose two distal ends of the first groove 23 as well as two distal ends of the second groove 24.

Figure 7:
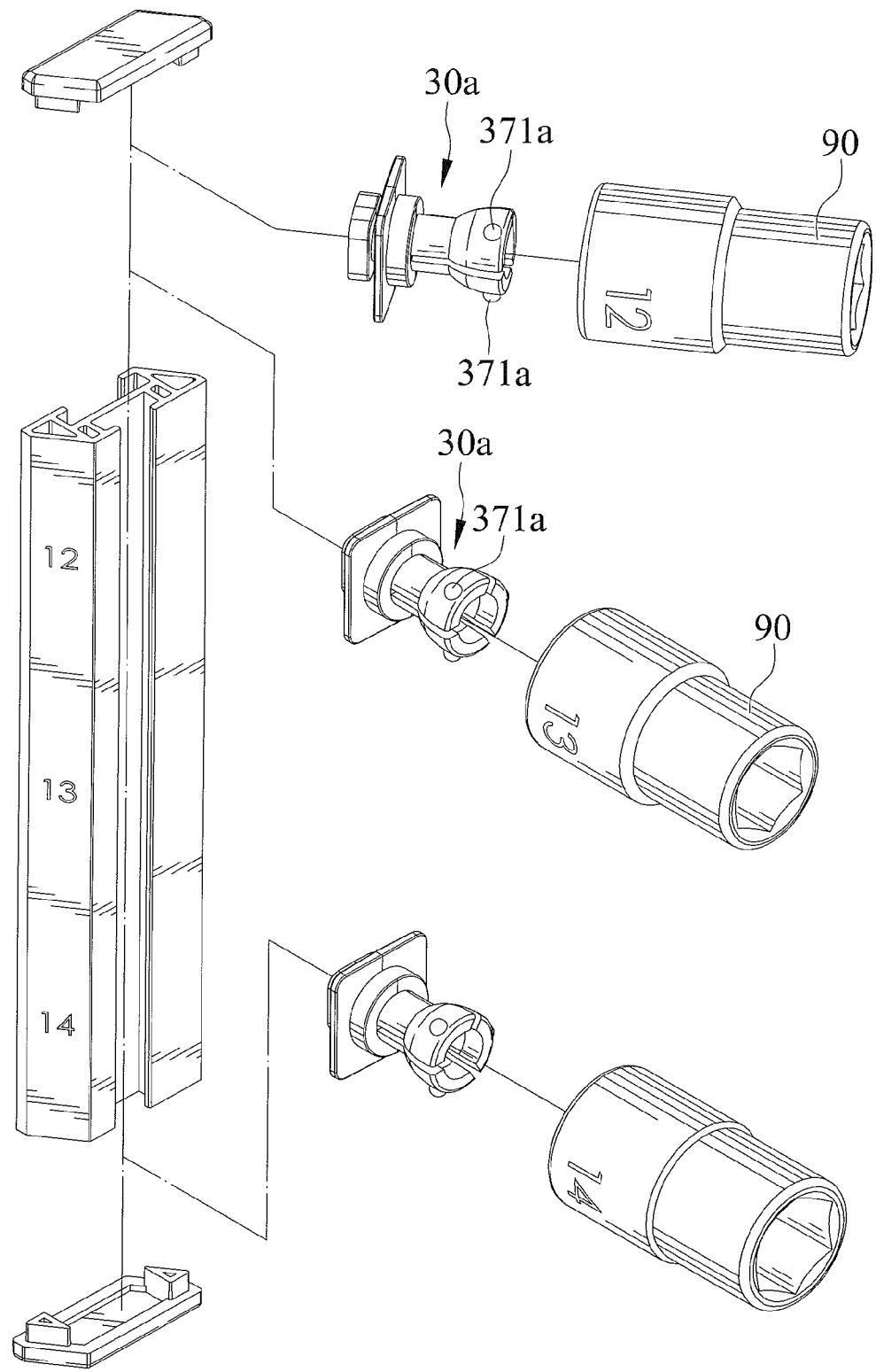
FIG. 7 is an exploded perspective view of a tool rack in accordance with a second embodiment of the present invention.
Figure 8:
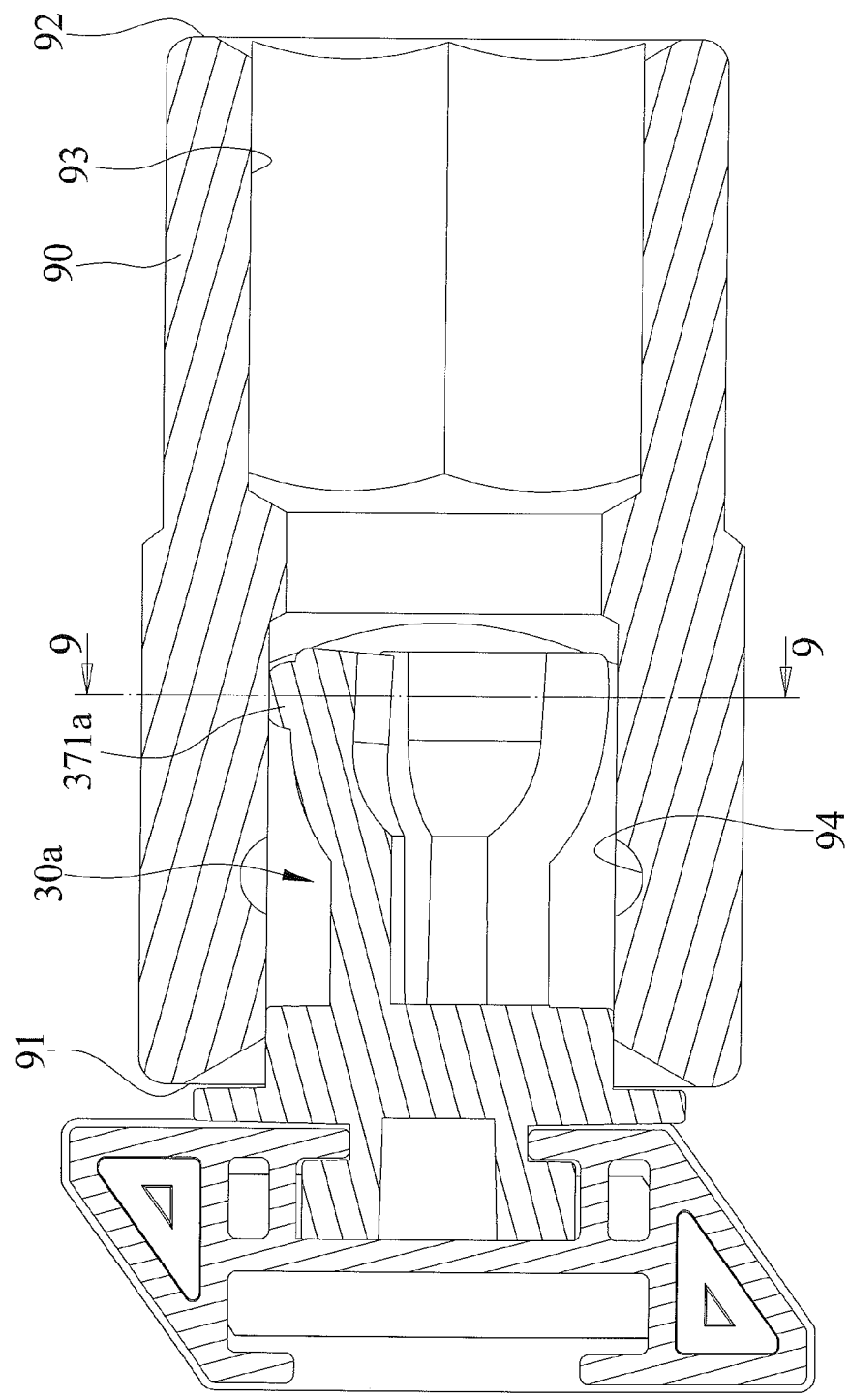
FIG. 8 is a partial, cross-sectional view of the tool rack of the second embodiment of the present invention, with the tool rack holding a socket.
Figure 9:
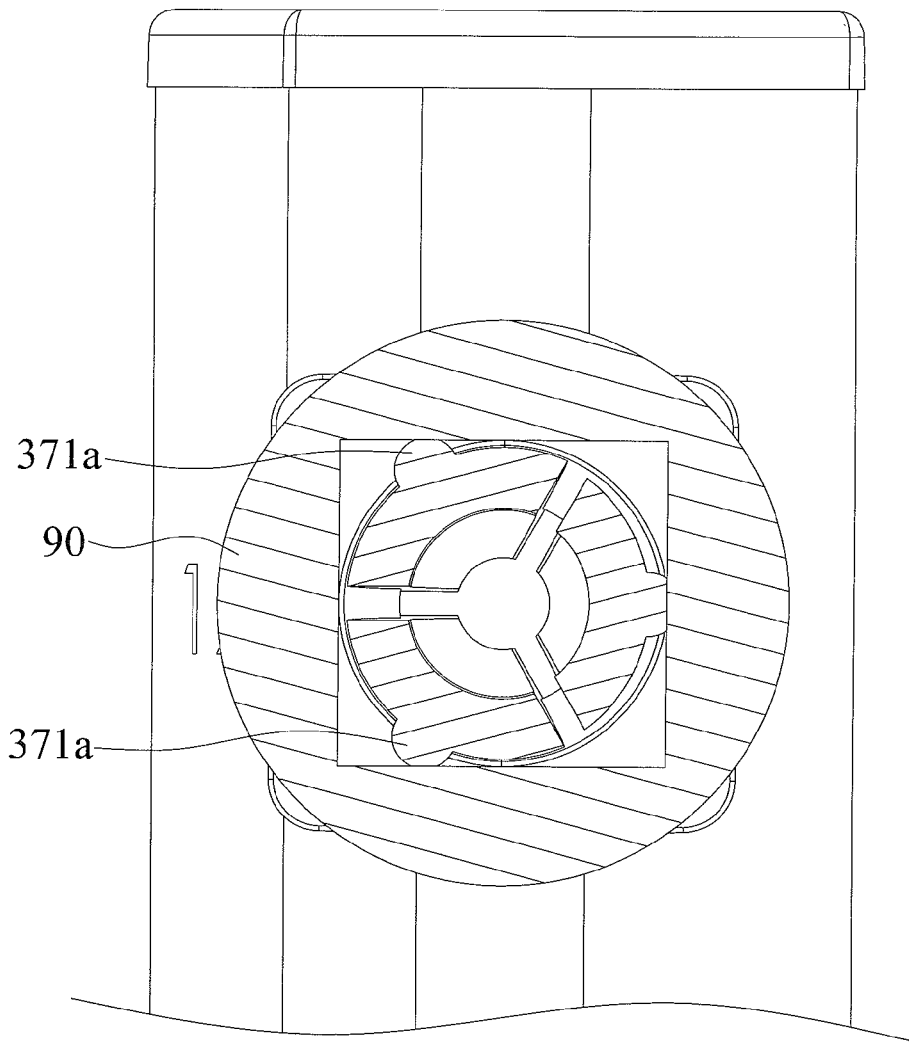
FIG. 9 is a cross-sectional view taken along line 9-9 of FIG. 8.

FIGS. 7 through 9 show a tool rack in accordance with a second embodiment of the present invention. In the second embodiment, at least one joint 30a replaces the at least one first and second joints 30 and 40. The at least one joint 30a is similar to the at least one first and second joints 30 and 40 except that it includes at least one protrusion 371a of a semispherical shape.

In view of the forgoing, each of the at least one first and second joints 30, 30a and 40 includes the first or second flange 36 or 46 thereof having the maximum width defining the first or third width W1 or W3, and the second end of each of the at least one first and second joints 30, 30a, and 40 that includes the first or second protrusion 371, 371a, or 471 has the maximum width defining the second or fourth width W2 or W4. The second or fourth width W2 and W4 is not less than the first or third width W1 or W3. When the tool rack 10 holds the at least one socket 90, the at least one socket 90 is restrained by the first or second protrusion 371, 371a, or 471, with the at least one socket 90 including the inner periphery thereof receiving the at least one first or second joint 30, 30a, or 40, and with the first or second protrusion 371, 371a, or 471 abutting the inner periphery of the at least one socket 90.

The foregoing is merely illustrative of the principles of this invention and various modifications can be made by those skilled in the art without departing from the scope and spirit of the invention.

What is claimed is:

1. A tool rack comprising:
   a main body, wherein the main body delimits at least one groove; and
   at least one joint including a first end disposed on the main body, a second end opposite to the first end in a direction of a first phantom axis and distal to the main body, a flange between the first and second ends, an elastic structure extending from the flange to the second end, and at least one protrusion extending radially outward from the elastic structure, wherein the at least one joint includes the first end thereof including a connecting structure engaging in the at least one groove, wherein the at least one groove includes a space and has a bottom side and two restraining lateral sides, wherein the at least one joint includes the connecting structure configured to include a pedestal restrained in a first compartment of the space of the at least one groove and a neck restrained in a second compartment of the space of the at least one groove respectively, wherein the first compartment is larger than the second compartment, wherein the at least one groove has an open end delimiting an end of the second compartment of the space of the at least one groove and includes the bottom side thereof opposite the open end, with the elastic structure including a plurality of elastic members arranged annularly and delimiting an open space, with two adjacent elastic members of the plurality of elastic members separated from one another with a gap, with the gap connecting to the open space, with the flange having a maximum width defining a first width measured in a width direction of the at least one joint, with the second end of the at least one joint that includes the at least one protrusion having a maximum width defining a second width measured in the width direction of the at least one joint, with the width direction of the at least one joint radial to the direction of the first phantom axis, and with the second width being not less than the first width;

wherein the tool rack is adapted to hold a socket, and wherein when the tool rack holds the socket, the socket is restrained by the at least one protrusion, with the at least one joint adapted to be received in an inner periphery of the socket, and with the at least one protrusion adapted to abut the inner periphery of the socket.

2. The tool rack as claimed in claim 1, wherein the at least one joint has a width measuring an end of the elastic structure that is adjacent to the flange less than the first width.

3. The tool rack as claimed in claim 1, wherein each of the plurality of elastic members has a first end adjacent to the flange and a second end opposite the first end in the direction of the first phantom axis, and wherein the first and second ends of each of the plurality of elastic members extend annularly and radially to the direction of the first phantom axis.

4. The tool rack as claimed in claim 3, wherein the elastic structure has an end adjacent to the flange with the end having a width in the width direction of the at least one joint less than the first width.

5. The tool rack as claimed in claim 1, wherein the at least one protrusion extends annularly and radially to the direction of the first phantom axis.

6. The tool rack as claimed in claim 1, wherein the at least one protrusion has a semispherical shape.

7. The tool rack as claimed in claim 1, wherein the at least one joint includes the first end thereof including a platform between the connecting structure and the flange, with the platform including a first side thereof including the connecting structure extending therefrom and a second side thereof including the flange extending therefrom respectively, and wherein the platform has a size greater than a size of the open end of the at least one groove and is disposed outside the at least one groove.

8. The tool rack as claimed in claim 1, wherein the main body defines a base with a first base side and a second base side opposite the first base side, and wherein the at least one joint includes at least one first joint disposed on the first base side and at least one second joint disposed on the second base side, respectively.

9. A tool rack comprising:
a main body, wherein the main body defines a base with a first base side and a second base side opposite the first base side, wherein the first base side of the main body includes a first outer surface and the second base side of the main body includes a second outer surface opposite the first outer surface; and at least one joint including a first end disposed on the main body, a second end opposite to the first end in a direction of a first phantom axis and distal to the main body, a flange between the first and second ends, an elastic structure extending from the flange to the second end, and at least one protrusion extending radially outward from the elastic structure, wherein the at least one joint includes at least one first joint disposed on the first based side and at least one second joint disposed on the second base side, respectively, wherein the at least one first joint is disposed on the first outer surface and the at least one second joint is disposed on the second outer surface respectively, wherein the first base side of the main body includes a third outer surface extending from and inclining at a first included angle with respect to the first outer surface thereof and the first included angle is greater than 90 degrees and less than 180 degrees, wherein the second base side of the main body includes a fourth outer surface extending from and inclining at a second included angle with respect to the second outer surface thereof, wherein the second included angle is greater than 90 degrees and less than 180 degrees, with the elastic structure Including a plurality of elastic members arranged annularly and delimiting an open space, with two adjacent elastic members of the plurality of elastic members separated from one another with a gap, with the gap connecting to the open space, with the flange having a maximum width defining a first width measured in a width direction of the at least one joint, with the second end of the at least one joint that includes the at least one protrusion having a maximum width defining a second width measured in the width direction of the at least one joint, with the width direction of the at least one joint radial to the direction of the first phantom axis, and with the second width being not less than the first width;

wherein the tool rack is adapted to hold a socket, and wherein when the tool rack holds the socket, the socket is restrained by the at least one protrusion, with the at least one joint adapted to be received in an inner periphery of the socket, and with the at least one protrusion adapted to abut the inner periphery of the socket.

10. The tool rack as claimed in claim 9, wherein the main body includes each of the third and fourth outer surfaces thereof including at least one size indicia, and wherein the at least one size indicia is adjacent and next to the at least one joint.

11. A combination of a tool rack and a socket comprising:
a tool rack including: a main body; and
at least one joint including a first end disposed on the main body, a second end opposite to the first end in a direction of a first phantom axis and distal to the main body, a flange between the first and second ends, an elastic structure extending from the flange to the second end, and at least one protrusion extending radially outward from the elastic structure, with the elastic structure including a plurality of elastic members arranged annularly and delimiting an open space, with two adjacent elastic members of the plurality of elastic members separated from one another with a gap, with the gap connecting to the open space, with the flange having a maximum width defining a first width measured in a width direction of the at least one joint, with the second end of the at least one joint that includes the at least one protrusion having a maximum width defining a second width measured in the width direction of the at least one joint, with the width direction of the at least one joint radial to the direction of the first phantom axis, and with the second width being not less than the first width;

at least one socket, wherein the tool rack holds the at least one socket, wherein the at least one socket is restrained by the at least one protrusion, with the at least one socket including an inner periphery thereof receiving the at least one joint, and with the at least one protrusion abutting the inner periphery of the at least one socket, wherein the at least one socket has a first end and a second end opposite the first end, wherein the at least one socket includes the first end thereof including a first cavity extending therefrom in a first direction, wherein the at least one socket includes the inner periphery thereof delimiting the first cavity, wherein the at least one socket includes the second end thereof including a driving end, wherein the driving end is configured to include a driving structure delimited by the inner periphery of the at least one socket, and wherein the at least one protrusion is free of interference with the driving structure when the at least one socket includes the inner periphery thereof receiving the at least one joint.

12. The combination of the tool rack and the socket as claimed in claim 11, wherein when the tool rack holds the at least one socket, the at least one socket is restrained by the flange, with the flange abutting the inner periphery of the at least one socket.

13. The combination of the tool rack and the socket as claimed in claim 11, wherein the at least one joint has a width measuring an end of the elastic structure that is adjacent to the flange less than the first width.

14. The combination of the tool rack and the socket as claimed in claim 11, wherein the main body defines a base with a first base side and a second base side opposite the first base side, and wherein the at least one joint includes at least one first joint disposed on the first base side and at least one second joint disposed on the second base side, respectively.

15. The combination of the tool rack and the socket as claimed in claim 14, wherein the first base side of the main body includes a first outer surface and the second base side of the main body includes a second outer surface opposite the first outer surface, wherein the at least one first joint is disposed on the first outer surface and the at least one second joint is disposed on the second outer surface respectively, wherein the first base side of the main body includes a third outer surface extending from and inclining at a first included angle with respect to the first outer surface thereof and the first included angle is greater than 90 degrees and less than 180 degrees, and wherein the second base side of the main body includes a fourth outer surface extending from and inclining at a second included angle with respect to the second outer surface thereof and the second included angle is greater than 90 degrees and less than 180 degrees.

16. The combination of the tool rack and the socket as claimed in claim 15, wherein the main body includes each of the third and fourth outer surfaces thereof including at least one size indicia, and wherein the at least one size indicia is adjacent and next to the at least one joint.

17. The combination of the tool rack and the socket as claimed in claim 11, wherein the first cavity is connected to a recess, wherein the recess extends radially outward from the first cavity in a second direction, which is radial to the first direction.

\* \* \* \* \*